Oct. 13, 1970  R. A. E. ZETTERLUND  3,533,614
WORKPIECE HOLDING DEVICE
Filed Dec. 19, 1966  2 Sheets-Sheet 1
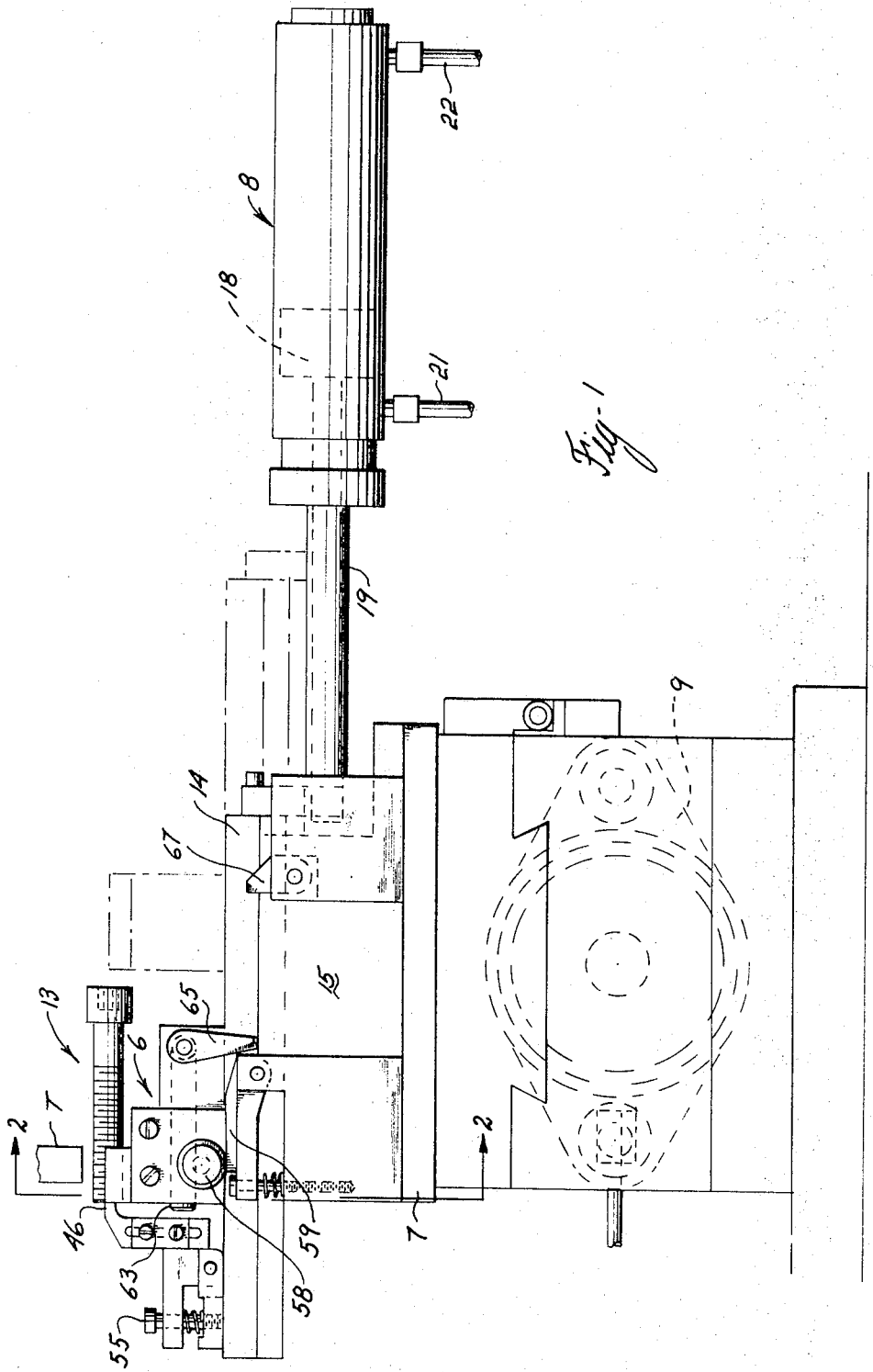
INVENTOR.
RUNE A. E. ZETTERLUND
BY
Synnestvedt & Lechner
ATTORNEYS

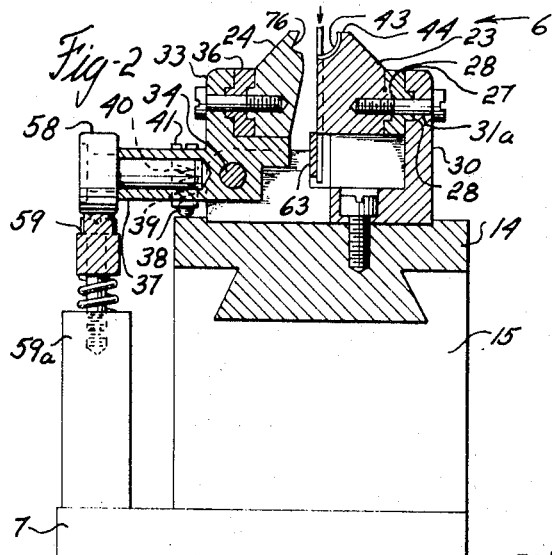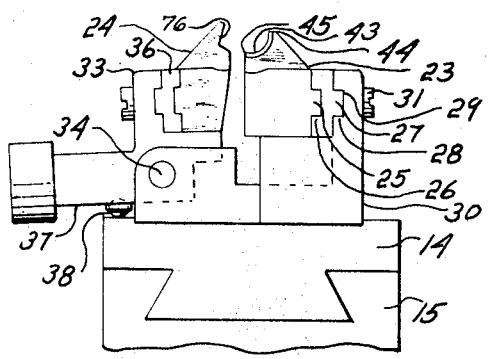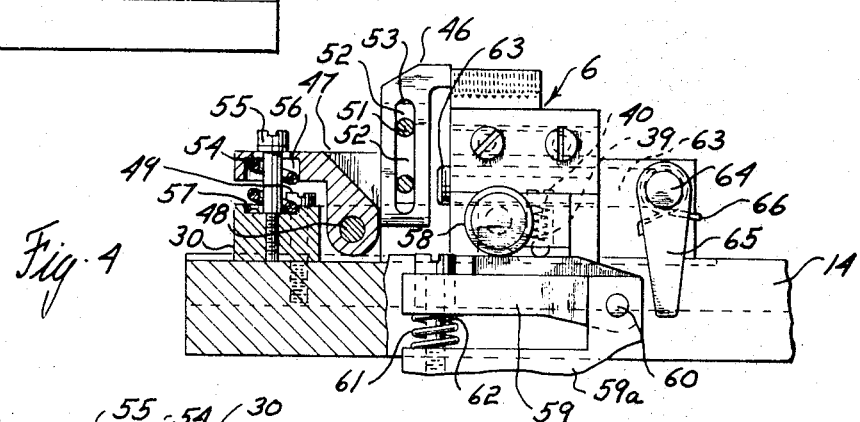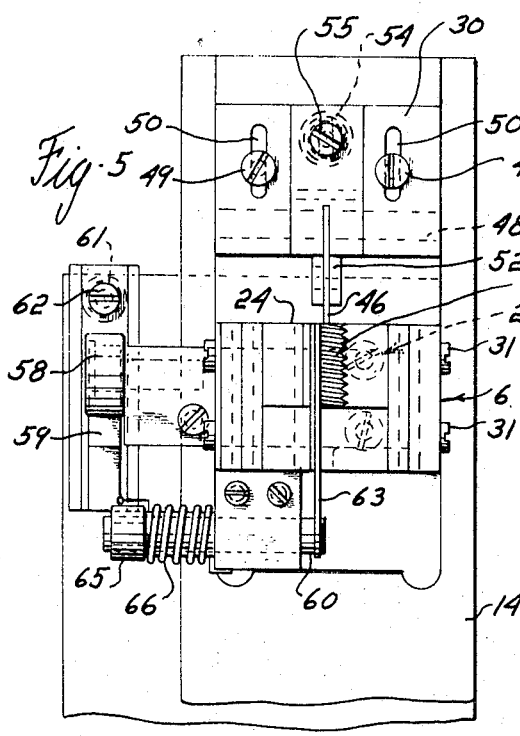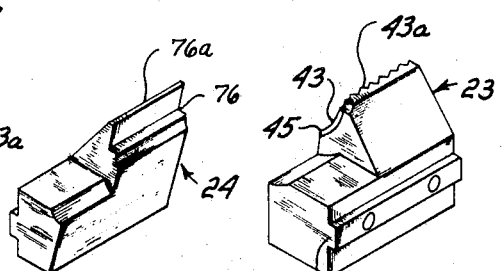

United States Patent Office 3,533,614
Patented Oct. 13, 1970

3,533,614
WORKPIECE HOLDING DEVICE
Rune A. E. Zetterlund, Willow Grove, Pa., assignor to Standard Pressed Steel Co., Jenkintown, Pa., a corporation of Pennsylvania
Filed Dec. 19, 1966, Ser. No. 602,803
Int. Cl. B23q 1/08; B25b 1/08, 1/24
U.S. Cl. 269—14        9 Claims

ABSTRACT OF THE DISCLOSURE

A fixture for holding an elongated workpiece during a processing operation and a tool for performing the processing operation having a line of action extending toward the fixture are disclosed. The fixture comprises a first holding unit rigidly secured to a base and a second holding unit pivotally mounted on the base and movable between an open and a clamping position. The first holding unit extends beyond the line of action of the tool to provide substantially all of the support for the workpiece when the processing operation is performed.

---

This invention relates to devices for supporting workpieces during a treatment operation and more particularly to a workpiece holding device which is especially suited for holding elongated workpieces during an operation involving the application of substantial pressure to a surface of the workpiece.

While not limited thereto, the invention is particularly adapted for the support of threaded workpieces such as bolts and related fasteners during the application of a plastic material under pressure to the threaded shank of the bolt. The invention is well suited for the transfer of a workpiece from a loading station to one or more stations at which workpiece heating means and/or various tools may be located which are used to carry out a processing operation.

Apparatus formed in accordance with the teachings of the invention is capable of use where sustained high speed automated operation is required. When used as a part of equipment for applying thermoplastic materials to the threads of externally threaded devices, the apparatus is extremely effective in aligning and positioning the localized area of the threads so that the thermoplastic is uniformly positioned and applied.

Accordingly, an important object of the invention is the provision of a holding fixture constructed and arranged to permit, in sequence, rapid loading and thereafter accurate positioning of the portion of a workpiece to be treated.

Another object of the invention is the provision of a workpiece holder which permits the application of substantial pressure to a surface of a workpiece without damage to threads or other surface portions of the workpiece.

Another object of the invention is the provision of a holder especially well suited for handling a wide variety of sizes of elongated workpieces.

Still another object of the invention is the provision of a holding device for an elongated workpiece which is extremely reliable and permits the achievement of high production rates.

A more specific object of the invention is the provision of a holding fixture for fixedly gripping a threaded fastener during a treatment operation involving the application of substantial pressure to the fastener threads.

Briefly stated, the foregoing and other objects of the invention are achieved by a workpiece holding device or fixture which includes a pair of elongated holding fingers mounted in side-by-side relationship on a support surface. An elongated recess is formed in the adjacent face of each of the fingers, the recesses cooperating to form a pocket within which a workpiece is supported. The pocket is formed with an open side which faces a tool to permit contact between the tool and the workpiece surface. One of the fingers is mounted for movement towards and away from the other finger to permit insertion of a workpiece into the pocket. The recess in the other finger is formed so that it provides a support surface extending beyond the line of application of force by the tool whereby substantially all of the load applied on the workpiece by said tool is carried by the other finger.

The foregoing will be fully apparent upon reference to the following detailed description of an illustrative embodiment of the invention when viewed in light of the accompanying drawings in which:

FIG. 1 is a view showing an elevational view of a preferred workpiece holding fixture formed according to the invention;

FIG. 2 is a sectional view of an enlarged scale taken along line 2—2 of FIG. 1;

FIG. 3 is an elevational view of the holding fixture of FIG. 2;

FIG. 4 is a side elevational view of the fixture shown in FIGS. 1 through 3 on the same scale as FIGS. 2 and 3;

FIG. 5 is a plan view of the fixture with the parts shown in the same position as shown in FIG. 2;

FIG. 6 is an isometric projection of the workpiece gripping portion of the left hand finger shown in FIGS. 2, 3 and 5; and FIG. 7 is an isometric projection of the workpiece gripping portion of the right hand finger shown in FIGS. 2, 3 and 5.

Although holding fixtures constructed according to the teachings of the invention may be fixedly mounted and used in association with a tool which is mounted for transverse movement toward and away from a position of alignment with the fixture, in most instances I prefer to mount the fixture for movement to a position of alignment with a tool after which the tool is moved axially into pressure contact with the workpiece. A fixture so mounted is shown at 6 in FIG. 1.

The illustrative embodiment of the invention as shown in FIG. 1, includes means for imparting the desired motion to the fixture from a loading position to various positions on a support table 7 including a position in alignment with a tool schematically illustrated and identified by the reference character T. Typically, the means for moving the holder includes a pressure cylinder 8 which moves the holder or fixture 6 back and forth across the support table surface and may also include a pressure cylinder 9 which moves the support table transversely of the plane of movement of the holder as imparted by cylinder 8. The two cylinders provide for movement of the holder to various stations at which various treatment operations are carried out. It should also be understood that the mixtures could be mounted on a rotating support which moves the fixtures to a plurality of stations along a circular path.

Means, not shown, are provided for imparting axial movement to the tool along a line extending towards and away from the table 10. Tool T may be a drill, other rotary cutting tool, a punch, or a die similar to the one shown in Pat. No. 3,093,177, of Joseph P. Villo, assigned to the assignee of this application.

In FIG. 1, a holding fixture 6 is shown in a position in which the tool T is about to contact a portion of the threaded surface of a bolt 13. The fixture 6 is mounted on a slide 14 which moves in a dovetailed track formed in a fixed support 15 (FIG. 2) carried by and secured to table 7. Slide 14 moves back and forth between first and second limits of travel in order to move the holding fixture between a loading position in which a workpiece is placed in the fixture either automatically or manually, and a treatment position in which the workpiece is located beneath the tool T. Fixture 6 is shown in its first limit of travel in phantom lines and in the second limit of travel in full lines in FIG. 1.

Two-way pressure cylinder 8 is fixedly mounted with respect to the support 15 and is provided for the purpose of moving holder or fixture 6 relative to the table. A piston 18 having a piston rod 19 connected thereto is slideably mounted within the cylinder. Piston rod 19 is bolted or otherwise securely fastened to a downwardly projecting arm of the slide 14. Air or hydraulic fluid lines 21 and 22 are connected to the cylinder on opposite sides of piston 18 to cause reciprocating motion of the piston rod to thereby move the holding fixture back and forth across the table.

As may be best seen upon reference to FIGS. 2 through 7, the workpiece holding fixture includes a pair of clamping fingers 23 and 24 between which the workpiece is adapted to be placed, either manually or by a suitable automatic loader.

To insure correct alignment and positioning of the clamping fingers, a range of sizes of ribbed spacer members are provided for mounting the fingers in their fixture. To accommodate a spacer, a rib 25 is formed in one side of finger 23. The rib 25 fits in a groove 26 in spacer member 27. The spacer in turn has a rib 28 which fits in a groove 29 in the bracket 30. A pair of machine screws 31 are employed to fasten the finger to the bracket. The screws pass through openings 31a in bracket 30 and are threaded into the finger.

Finger 24 is mounted in a bracket 33 which is mounted for limited movement so that the finger 24 can be moved towards and away from finger 23. Preferably the bracket is pivotally mounted with respect to bracket 30 by means of a pivot pin 34. The finger 24 is secured to the bracket 33 by means of a ribbed spacer 36 which fits between the bracket 33 and the finger as may be seen in FIGS. 6 and 7. Spacer members 27 and 36 permit the use of clamping fingers of different sizes which may be required to accommodate different sizes and shapes of workpieces.

A laterally extending arm 37 extends outwardly from the pivotally mounted bracket 33. A ball 38 is mounted in a vertically extending bore 39 in arm 37. A spring 40 shown in FIG. 2 is fitted within the bore on top of the ball. A set screw 41 is threaded into the bore and is adjustable to vary the compressive force with which the spring urges the ball downwardly. A retainer collar 42 is mounted in the opening of the bore underneath the arm 37 and retains the ball within the bore. The spring loaded ball rides on the flat upper surface of the slide 14 and yieldingly holds the arms 37 and the clamping finger 24 in the position shown in FIG. 3.

As viewed in FIGS. 2, 3, 5 and 7, the clamping finger 23 is provided with an elongated recess 43 of arcuate cross section. The recess is preferably provided with transversely extending threads 43a which are shaped to interfit with the threads of an externally threaded workpiece. The recess faces in a direction which is generally upwardly and inwardly with respect to the fingers 24. The curved surface of recess 43, when viewed in elevation, as for example in FIG. 2, preferably describes an arc of slightly more than 90 degrees so that it provides bottom support and lateral support to the workpiece. The lower edge 45 of the threaded recess should extend to a point slightly beyond the line of application of the force exerted by the tool (shown by the arrow in FIG. 2) to provide support for a fastener held by the fingers when the tool presses against the fastener threads. Moreover, I prefer that the upper edge 44 should be above the longitudinal axis of the workpiece to provide full lateral support.

Clamping finger 24 is provided with a recess 76 which is preferably generally L shaped in cross section and cooperates with the threaded recess in clamping finger 23 to form a workpiece holding pocket. To insure proper clamping action and lateral support, the upper edge 76a of the finger 24 should be positioned to engage the workpiece slightly above its center line, that is, above the longitudinal axis of the workpiece.

In the position in which finger 24 is shown in FIG. 3, the pivot 34 and the spring loaded ball arangement permits finger 24 to yield somewhat as a bolt is pressed against the upper edge of the L shaped recess. This amount of movement is not great, being merely enough to allow the bolt threads to clear the threads in finger 23. The bolt can then be easily moved by the operator axially of the finger until it is properly positioned with its threads located so that they will mesh with the threads of finger 23. When the operator releases the bolt, the spring biased finger 24 urges the bolt against the finger 23 and holds it in that position with the threads enmeshed.

To help in locating the bolt in the proper axial position within the pocket formed by fingers 23 and 24, I prefer to use a yieldable screw loading stop 46 which is mounted on an extension of the bracket 30. This is perhaps best seen in FIG. 4 where the screw loading stop 46 is adjustably supported on a bracket 47 which is in turn pivotally mounted by means of a pivot pin 48 on the bracket 30.

Bolts 49, shown in FIG. 4 and 5, pass through elongated slots 50 in the rearwardly extending portion of the bracket 30. The slots permit the stop and the holding fixture to be secured to the dovetailed slide 14 and to be adjustably positioned thereon so that the area of the workpiece to be treated can be precisely positioned.

Machine screws 51 clamp the workpiece loading stop 46 between a pair of upright arms 52 integral with the bracket 47 (see also FIG. 1). An elongated slot 53 through which the screws 51 pass is formed in the stop. The arrangement permits vertical adjustment of the stop so that it can be accurately aligned with the ends of different length workpieces.

To permit limited axial movement of the workpiece after it contacts the stop, the loading stop is spring biased to resist pivoting about pivot 48 when the tip of the workpiece is pressed against it. For this purpose, a coil spring 54 surrounds the shank of a machine bolt 55 which is threaded into the support 30. The spring sits in recess 56 in the bracket and a recess 57 in the support and is held in position by the bolt 55. The spring urges the bracket as well as the stop 46 in a clockwise direction as viewed in FIG. 4.

In operation of the structure so far described, when the holding fixture is in the retracted position on the table (i.e., at the loading station shown in phantom in FIG. 1) the operator presses a bolt into the pocket formed between the fingers 23 and 24, initially pressing the bolt against the sides of recess 76 in finger 24 (see FIGS. 2 and 3) so that that finger is rocked in the counter-clockwise direction as viewed in those figures. As noted above, finger 24 can rock far enough so that the threads of the bolt clear the threads in the finger 23. The bolt is then free to move axially in the recess until its end engages the loading stop 46 and thereafter until the stop is rocked about its pivot point against the bias of the spring 54. When the operator releases the bolt, the spring loaded ball 38 urges the gripping finger 24 towards the finger 23. The workpiece may thereafter move slightly axially (due to cam action of the bolt and finger threads) into meshing registry with the threads of finger 23 after which further movement is not possible.

After the bolt has been loaded in the holding fixture, pressure is delivered to the cylinder 8 through line 22. The dovetail slide 14 and the workpiece holding fixture are thus moved from the dotted position shown in FIG. 1 towards the position shown in full lines in that figure.

During movement of the workpiece holder to the treatment station, a roller 58 carried by arm 37 rides up on a horizontal cam ramp 59 secured to table 10. This arrangement is best shown in FIGS. 2 and 4 and is provided for the purpose of rigidly gripping the workpiece during treatment operations.

Preferably, the forward end of cam ramp 59 is connected to a table bracket 59a by a horizontally extending pivot pin 60 whose rotational axis is perpendicular to the plane of holder movement. The opposite end of the ramp is spring urged upwardly by means of a coil spring 61 mounted on the shank of a guide bolt 62. Guide bolt 62 passes through a hole in the end of the ramp 59 and is secured to the table bracket 59a. Spring 61 presses against the underside of a ramp 59. As the roller 58 rides up on the ramp 59, the arm 37 and hence the finger 24 is rocked towards finger 23 a further amount causing the finger 24 to clamp the fastener tightly in the pocket formed by the fingers. The resilient mounting for ramp 59 allows the ramp to yield somewhat to accommodate variations in workpiece size.

The apparatus of the invention also preferably includes means to eject the bolt from the workpiece holding fixture at the end of a treatment cycle. The preferred ejection mechanism can best be seen in FIGS. 1, 4 and 5. It includes an elongated ejection arm 63 axially aligned with and mounted beneath the fingers 23 and 24. The arm 63 is secured to a pin 64 mounted for rotary movement in a horizontal bore which extends through bracket 30 on a line which is perpendicular to the bolt axis (see FIG. 4 and 5). As is shown in FIGS. 2 and 4, arm 63 is spaced below and between the gripping fingers 23 and 24 and is free to move upwardly so that its free and 63 can project beyond the top surface of the fingers 23 and 24.

A tripping arm 65 depends from the opposite end of the pin 64. A torsion spring 66, yieldably connects the tripping arm 65 to the pin 64. As shown in FIG. 1, a tripping arm actuator or latch 67 is mounted on table 7 in the path of the tripping arm 65.

If, as is sometimes the case, the processing operations involve the use of an induction heater for heating the workpiece while it is in the holding fixture, the fingers, the associated mounting brackets and the spacers should be made of materials that have considerably lower magnetic permeability than the workpiece in order to insure heat build-up in the workpiece rather than in the fixture. In fact, I have found that stainless steel bolts could not be effectively heated by an induction heater when held in a carbon steel fixture. Consequently, I prefer that the chrome-nickel superalloys such as type A-286 alloy steel be employed for the holder components and these will permit processing of workpieces of stainless steel as well as the more common oxide coated and cadmium plated steel fasteners.

When the holding fixture moves from the broken line position shown in FIG. 1 to the full line position, the tripping arm 65 is rocked by the latch 67, but the spring connection permits movement of the arm with respect to the pin 64 without moving ejection arm 63. However, when the holding fixture moves in the reverse direction back to the broken line position, the latch 67 engages and causes the arm 65 to pivot and urges the ejection arm 63 upwardly so that it strikes the underside of a bolt gripped between the fingers. The fingers will have relaxed their grip on the bolt somewhat at this point, because the cam follower or roller 58 will have moved down off the ramp 59. The ejection arm spring is tensioned sufficiently to overcome the remaining pressure exerted against the bolt by the fingers and ejection arm 63 forces the fastener upwardly free and clear of the holding fixture. The torsion spring 66 brings the ejection arm back after arm 65 has passed latch 67. If desired, suitable guide and conveyor structure may be provided on the cross slide 14 or on the base for receiving the ejected fasteners.

I have found that the structure described above is most effective in carrying out the objects of the invention and is particularly effective in handling threaded workpieces during a treatment operation. Such workpieces can be quickly and easily loaded in my novel holding fixture by relatively unskilled personnel and properly positioned so that the localized area to be treated is invariably aligned with the treatment tool. The structure is extremely effective where movement of a workpiece to a plurality of stations at which applications of heat and pressure are applied and in such instances, has proven to be capable of the sustained high speed operation required for the economical production of fasteners and similar elongated workpieces.

I claim:

1. A fixture adapted to hold an elongated workpiece during a workpiece processing operation in combination with a tool for applying pressure to said workpiece, said tool having a center movable along a line extending toward said fixture; said fixture comprising:
   a support base;
   a first holding unit rigidly secured to said support base, said first holding unit having an elongated recess facing said tool and adapted to receive said workpiece, having upper and lower transverse edges and having a longitudinal line intermediate the transverse edges that is perpendicular to said line along which said tool moves, said longitudinal line including a point on said recess which is intersected by said line along which said tool moves so that said line along which said tool moves intersects said recess intermediate the transverse edges;
   a second holding unit pivotally mounted on said support base, said second holding unit being movable between first and second positions, each located on a line parallel to said transverse edges, said second position, being closer to said first holding unit than said first position, whereby when said second holding unit is in said first position, a pocket adapted to receive said workpiece is formed and when said second holding unit is in said second position, a pocket adapted to clamp said workpiece is formed;
   and means for selectively moving said second holding unit between said first and second positions.

2. A combination according to claim 1 wherein said recess in said first holding unit is circular and greater than 90° in arc length and is provided with threads adapted to interfit with the threads of an externally threaded workpiece to hold said workpiece against axial movement when said second holding unit is in said second position.

3. A combination according to claim 1 wherein said means for moving said second holding unit include a camming ramp adjacent said second holding unit and a roller extending from said second holding unit and positioned to ride up and down said ramp.

4. A combination according to claim 1 further including means for ejecting said workpiece from said pocket when said second holding unit moves from said second position to said first position.

5. A fixture according to claim 4 wherein said ejecting means includes an operating arm movable between said first and second holding units in a plane parallel to said longitudinal line on said first holding unit.

6. A combination according to claim 1 wherein said first holding unit comprises a bracket carried by said support base and a holding finger carried by said bracket, said holding finger including said recess.

7. A combination according to claim 6 wherein said second holding unit comprises a bracket mounted on a pin carried by said support base and a holding finger by said bracket.

8. A combination according to claim 7 wherein said fingers of said first and second holding units are formed of a material having a lower magnetic permeability than said workpiece.

9. A combination according to claim 7 wherein said holding fingers are mounted on said support members by tongue and groove arrangements.

References Cited
UNITED STATES PATENTS

| | | | |
|---|---|---|---|
| 159,229 | 1/1875 | Stouffer | 81—425 X |
| 389,666 | 9/1888 | Reagan | 81—425 X |
| 409,108 | 8/1889 | Leighton | 279—7 |
| 760,411 | 5/1904 | Arnold | 269—261 |
| 1,299,931 | 4/1919 | Geisenhoner. | |
| 2,980,928 | 4/1961 | Wallace et al. | |
| 1,405,492 | 2/1922 | Clary | 269—14 X |
| 3,015,117 | 1/1962 | Braendel | 10—139 |
| 3,173,676 | 3/1965 | Chenette | 269—268 X |
| 3,226,104 | 12/1965 | Preisser | 269—229 X |

WILLIAM S. LAWSON, Primary Examiner

L. GILDEN, Assistant Examiner

U.S. Cl. X.R.

10—139; 269—56, 229, 238, 269, 270